United States Patent
Bashkirov et al.

(10) Patent No.: US 10,777,006 B2
(45) Date of Patent: Sep. 15, 2020

(54) VR BODY TRACKING WITHOUT EXTERNAL SENSORS

(71) Applicant: Sony Interactive Entertainment Inc., Tokyo (JP)

(72) Inventors: Sergey Bashkirov, San Mateo, CA (US); Takeo Matsukawa, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 325 days.

(21) Appl. No.: 15/791,029

(22) Filed: Oct. 23, 2017

(65) Prior Publication Data

US 2019/0122436 A1      Apr. 25, 2019

(51) Int. Cl.
*G06T 19/00* (2011.01)
*G06T 13/40* (2011.01)
(Continued)

(52) U.S. Cl.
CPC ............ *G06T 19/006* (2013.01); *B25J 9/163* (2013.01); *G05B 11/32* (2013.01); *G06N 20/00* (2019.01);
(Continued)

(58) Field of Classification Search
CPC ....... G06T 19/006; G06T 13/40; G06T 11/60; G06T 2207/30196; G06N 20/00;
(Continued)

(56) References Cited

U.S. PATENT DOCUMENTS 6,806,879 B2 * 10/2004 Isner ....................... G06T 13/40
                                                        345/474
8,948,447 B2 *  2/2015 Wooley .................. G06F 3/011
                                                        382/103

(Continued)

FOREIGN PATENT DOCUMENTS

CN          106896796 A      6/2017

OTHER PUBLICATIONS

Lei et al., "Whole-body Humanoid Robot Imitation with Pose Similarity Evaluation", Signal Processing, vol. 108; Aug. 26, 2014; pp. 136-146.

(Continued)

*Primary Examiner* — Khoi H Tran
*Assistant Examiner* — Kyle T Johnson
(74) *Attorney, Agent, or Firm* — John L. Rogitz

(57) ABSTRACT

Plural individual sensor assemblies are engaged with respective parts of a person's body. Each assembly may include accelerometers, magnetometers, and gyroscopes. Sensor data is fused together to get the orientation at each body location. To simplify, the body is assumed to consist of rigid bars of known length connected with ball joints so that once the relative orientations of all bars are given by the respective assemblies, body pose can be computed. Then the body pose is translated as a virtual body into a virtual world either by a ray cast method that anchors a foot of the virtual body to the ground assuming infinite gravity and infinite friction and then translating the other body parts to make the ground contact point fixed, or by implementing an approximate dynamics physics engine on the virtual body. The technique may be used in VR location-based entertainment and for motion capture.

14 Claims, 5 Drawing Sheets

(51) Int. Cl.
*G05B 11/32* (2006.01)
*G06T 11/60* (2006.01)
*G06N 20/00* (2019.01)
*B25J 9/16* (2006.01)

(52) U.S. Cl.
CPC .............. *G06T 11/60* (2013.01); *G06T 13/40* (2013.01); *A63F 2300/66* (2013.01); *G05B 2219/40116* (2013.01); *G06T 2207/30196* (2013.01)

(58) Field of Classification Search
CPC ........... G05B 11/32; G05B 2219/40116; B25J 9/163; A63F 2300/66
See application file for complete search history.

(56) References Cited

U.S. PATENT DOCUMENTS

| | | | | |
|---|---|---|---|---|
| 9,135,516 | B2* | 9/2015 | Hoof | G06K 9/4604 |
| 10,210,382 | B2* | 2/2019 | Shotton | G06K 9/00369 |
| 2001/0024512 | A1* | 9/2001 | Yoronka | G06K 9/00335 |
| | | | | 382/103 |
| 2005/0071306 | A1* | 3/2005 | Kruszewski | A63F 13/10 |
| | | | | 706/47 |
| 2005/0197198 | A1* | 9/2005 | Otten | A63B 69/3614 |
| | | | | 473/221 |
| 2009/0175540 | A1* | 7/2009 | Dariush | G06K 9/00362 |
| | | | | 382/195 |
| 2010/0201500 | A1* | 8/2010 | Stirling | A61B 5/1127 |
| | | | | 340/407.1 |
| 2010/0250001 | A1* | 9/2010 | Hodgins | B62D 57/032 |
| | | | | 700/261 |
| 2010/0302257 | A1* | 12/2010 | Perez | G06T 7/251 |
| | | | | 345/474 |
| 2012/0290131 | A1* | 11/2012 | Khoukhi | B25J 9/1623 |
| | | | | 700/250 |
| 2014/0149903 | A1 | 5/2014 | Ahn et al. | |
| 2014/0258192 | A1* | 9/2014 | Kim | G06Q 50/22 |
| | | | | 706/12 |
| 2015/0217449 | A1 | 8/2015 | Meier et al. | |
| 2016/0046023 | A1* | 2/2016 | Nagendran | B25J 9/1689 |
| | | | | 700/248 |
| 2016/0059412 | A1* | 3/2016 | Oleynik | B25J 9/0018 |
| | | | | 700/257 |
| 2016/0140750 | A1* | 5/2016 | Pai | G06T 13/20 |
| | | | | 345/420 |
| 2016/0184639 | A1* | 6/2016 | Bentley | G01P 13/00 |
| | | | | 700/91 |
| 2017/0178382 | A1* | 6/2017 | Levin | G06K 9/4652 |
| 2017/0192496 | A1* | 7/2017 | Balslev | G06F 3/011 |
| 2017/0200304 | A1 | 7/2017 | Li | |
| 2017/0228922 | A1* | 8/2017 | Kaeser | G06F 3/04845 |
| 2018/0045963 | A1* | 2/2018 | Hoover | G06F 3/011 |
| 2018/0225858 | A1* | 8/2018 | Ni | G06T 17/20 |
| 2019/0116322 | A1* | 4/2019 | Holzer | G06K 9/00369 |
| 2019/0122436 | A1* | 4/2019 | Bashkirov | G06N 20/00 |

OTHER PUBLICATIONS

International Search Report and Written Opinion from the counterpart PCT Application PCT/US18/56460 dated Feb. 6, 2019.

* cited by examiner

VR BODY TRACKING WITHOUT EXTERNAL SENSORS

FIELD

The application relates to technically inventive, non-routine solutions that are necessarily rooted in computer technology and that produce concrete technical improvements.

BACKGROUND

Knowing the "pose" (location and orientation) of various objects can be useful in many computer applications. As but one example, computer games such as virtual reality (VR) or augmented reality (AR) games are sometimes designed to receive, as input, pose information from a VR/AR headset worn by a player, or pose information of a hand-held device such as a computer game handset.

Current positioning solutions sometimes rely on visual tracking of objects with a video camera or laser beam to track the pose of objects of interest. These technologies require a sensor device to be within line of sight of the object for light to be able to travel towards device without meeting obstacles.

SUMMARY

As understood herein, the line of sight between the light sensor and the object of interest may be blocked. As also understood herein, it would be advantageous to capture motion of a person for a variety of applications without having to use a camera.

Accordingly, a method includes engaging plural motion sensor assemblies (MSA) to respective body parts, the MSA outputting pose information related to the respective body parts. The MSA may require no external power and may wirelessly communicate information to devices spaced from the person to which they are attached. The method also includes providing the pose information to a display apparatus for presenting an image of the body parts having respective poses according to the pose information. In addition, or alternatively, the method includes providing the pose information to a robot to cause the robot to move according to the pose information.

When the method includes providing the pose information to a display apparatus for presenting an image of the body parts having respective poses according to the pose information, the method may also include rendering the image using ray cast in which a foot of the image is constrained to remain on virtual ground with infinite gravity and infinite friction. Or, the method may include rendering the image using a modeled dynamics physics engine.

When the method includes providing the pose information to a robot to cause the robot to move according to the pose information, the method may also include implementing machine learning on the robot to control the robot in such a way that it doesn't fall/tip over by visually watching it while it is under control. During this, log data is collected and subsequently used to train a machine learning-based robot controller to make the robot act itself in the same way. Data collected includes pose information, sensor information, and command information (e.g., movement commands) as functions of time, which are input to the machine learning-based controller, with the new pose (pose at the next time step) being the output of the controller.

In another aspect, an assembly includes at least one virtual reality (VR) apparatus, plural motion sensor assemblies (MSA) outputting pose information related to poses of respective real-world body parts, and at least one transmitter sending the pose information to the VR apparatus. The assembly also includes at least one processor associated with the VR apparatus and configured with instructions for receiving the pose information, and presenting on the VR apparatus at least one image in a VR space that moves in the VR space according to the pose information.

In another aspect, a robot control system (RCS) includes plural motion sensor assemblies (MSA) outputting pose information related to poses of respective real-world body parts. The RSA includes at least one robot, at least one transmitter sending the pose information to the robot, and at least one processor associated with the robot and configured with instructions for receiving the pose information and moving the robot according to the pose information.

The details of the present application, both as to its structure and operation, can best be understood in reference to the accompanying drawings, in which like reference numerals refer to like parts, and in which:

DETAILED DESCRIPTION

Figure 1:
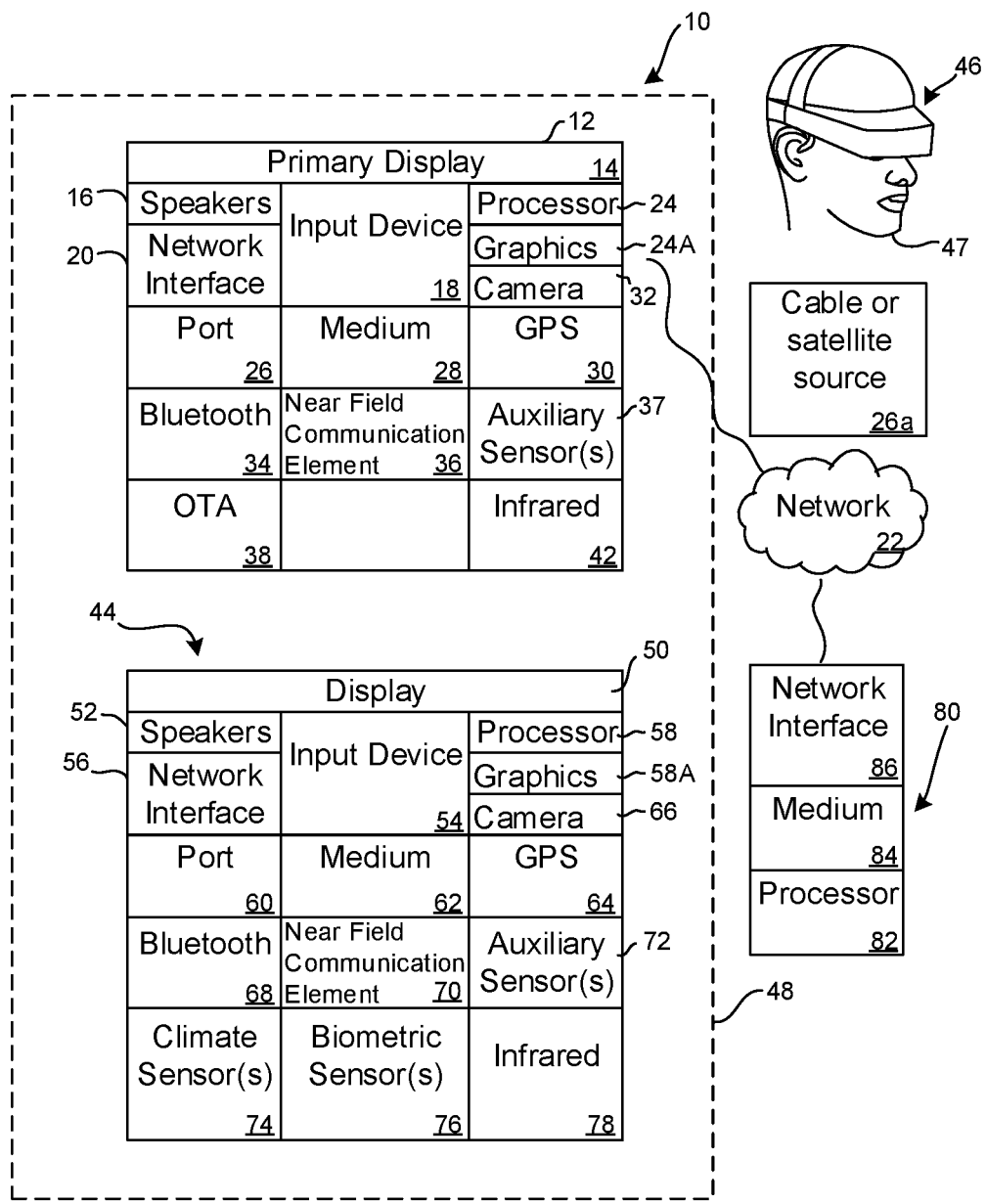
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers, this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth® and/or NFC technology, respectively. An example NFC element can be a radio frequency identification (RFID) element. Zigbee® also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12, as an example of a multiuser voice chat system.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured Advanced RISC Machine (ARM) microcontroller, an application specific integrated circuits (ASIC) or field programmable gate array (FPGA) modules, or any other convenient manner as would be appreciated by those skilled in those art. For example, a real-time operating system (RTOS) microcontroller may be used in conjunction with Linus or Windows-based computers via USB layers. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
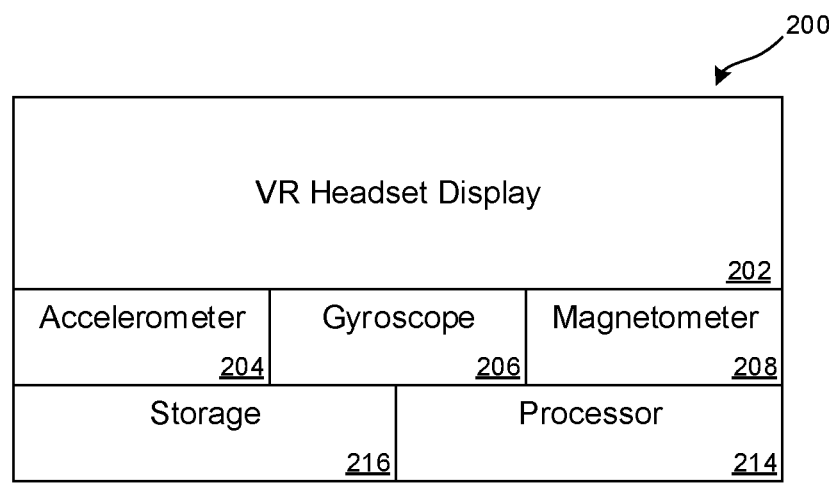
FIG. 2 is a block diagram of example pose-sensing components of an example object whose pose information is to be tracked.

FIG. 2 shows an example assembly 200 that may be incorporated into an object such as but not limited the object 47 in FIG. 1, e.g., a VR/AR headset or a hand-held computer game controller, to determine pose information related to the object and to send that pose information to, e.g., a computer game as input to the game. "Pose information" typically can include location in space and orientation in space. In an example, pose includes only orientation, with no stationary anchors needed for tracking. Note that a preferred pose sensor is a nine-axis sensor such that no external anchors are needed. Other sensor configurations, however, may be used.

The assembly 200 may include a headset display 202 for presenting demanded images, e.g., computer game images. The assembly 200 may also include an accelerometer 204 with three sub-units, one each for determining acceleration in the x, y, and z axes in Cartesian coordinates. A gyroscope 206 may also be included to, e.g., detect changes in orientation over time to track all three rotational degrees of freedom. While the assembly 200 may exclude the accelerometer 204 (and/or gyroscope 206) and rely only on a magnetometer 208, the accelerometer 204 (and/or gyroscope 206) may be retained as it is very fast compared to the magnetometer. Retaining these sensors further can be used as described further below to improve performance and precision using sensor fusion. Or, the magnetometer may be excluded. No magnet need be used in the assembly 200. All three of the accelerometer, gyroscope, and magnetometer may be included to provide a 9-axis of motion sensor.

A processor 214 accessing instructions on a computer memory 216 may receive signals from the magnetometer 208, accelerometer 204, and gyroscope 206 and may control the display 202 or feed pose data to different consumers, e.g., partner garners. The processor 214 may execute the logic below to determine aspects of pose information using the signals from the sensors shown in FIG. 2 and may also communicate with another computer such as but not limited to a computer game console using any of the wired or wireless transceivers shown in FIG. 1 and described above, including communication of the pose information to the other computer. In some embodiments the data from the magnetometer may be uploaded to a remote processor that executes the logic below.

Figure 3:
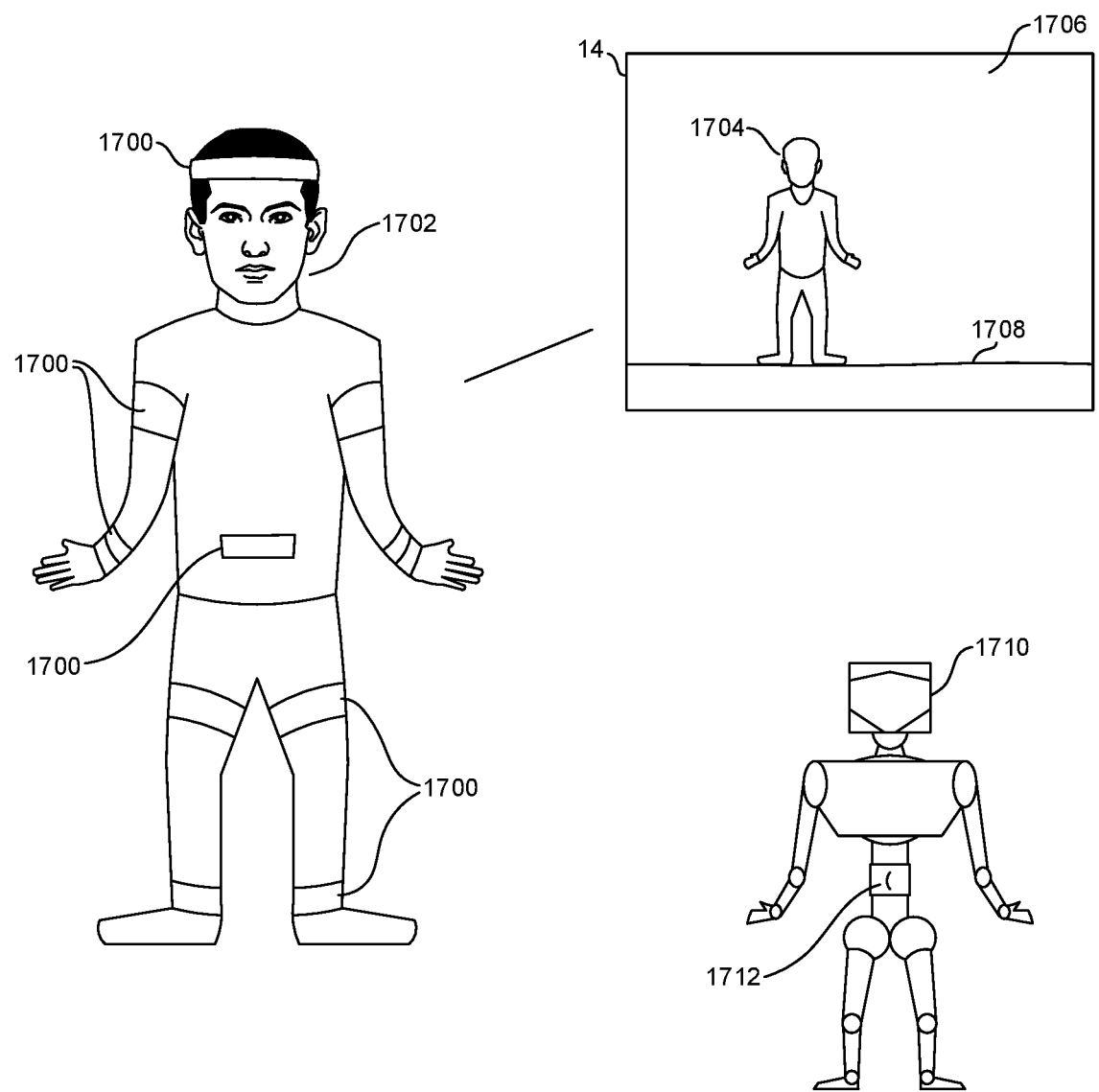
FIG. 3 is a schematic illustration of motion sensor assemblies attached to a person to render an image in VR space and/or to control a robot.

Moving to FIG. 3, an assembly 1700 which may include appropriate components of the assembly 200 in FIG. 2 may be attached to a body part by any suitable method, such as by using a hook and eye fastening material to attach the assembly 1700 to a person's clothing, by taping an assembly to a person, by using a belt or cord to attach the assembly to the person, by embedding the assemblies 1700 within the person's clothing, etc.

In the example shown, twelve assemblies 1700 are used, with one assembly on the head, one on the torso, one on each arm above the elbow, one on each arm below the elbow and above the hand, one on each hand, one on each leg above the knee, and one on each leg below the knee. The assembly 1700 on the torso may be taken as the reference location, the orientation from which the body pose signals from the other assemblies may be based. It is to be understood, however, that any of the assemblies 1700 may be taken as the reference.

While the components of the assembly 200 incorporated into the assemblies 1700 of FIG. 3 may output body pose with both orientation components and position components as described above, in some implementations the assemblies 1700 may output only orientation components, with position being determined by assuming that the arms and legs are rigid bars of a default length. More specifically and as set forth in greater detail below, a Kalman filter-based predictor or complementary filter-based predictor can be used to compute sensor orientation. Orientation can be used to extract pose information, e.g., mutual bone orientations. Mutual bone orientations (due to all bone lengths being pre-defined to approximate typical bone lengths) can be converted into (a) relative positions set. By integrating pose over time and assuming that virtual dynamics is defined, it is possible to compute virtual body position as well.

FIG. 3 also schematically illustrates applications for using the assemblies 1700. An image 1704 emulating the person 1702 may be presented in virtual space 1706 including virtual ground 1708 on a display such as the example display 14 shown in FIG. 1. The assemblies 1700 may wirelessly communicate with the display 14 so that the pose information generated by the assemblies 1700 is transmitted to the display and used to establish the pose of the corresponding body parts in the image 1704. To this end, the pose information from each assembly 1700 is accompanied by information pertaining to which body part the assembly 1700 is attached to.

Additionally, the motion of the person 1702 as output by the assemblies 1700 may be sent to a robot 1710 to cause the robot 1710 to mimic the motions of the person 1702. The pose information of the assemblies 1700 is used to establish the pose of the corresponding robot body parts. To this end, the robot 1710 may be controlled by a processor-implemented autonomous robot controller 1712 that is machine learning-based.

Figure 4:
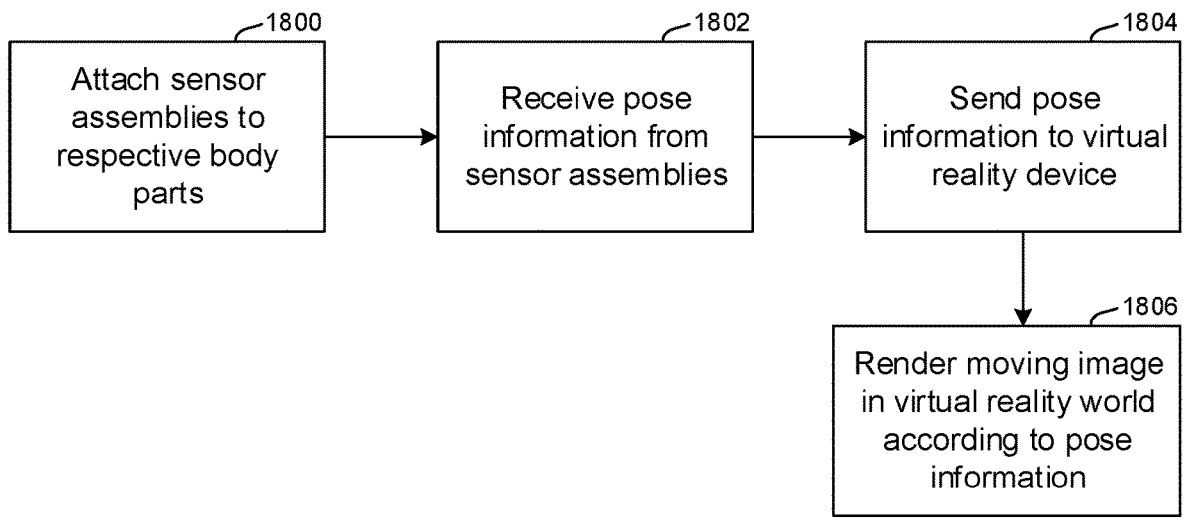
FIGS. 4-6 are flow charts of example logic consistent with present principles.

FIG. 4 illustrates logic that may be implemented at least in part by the processor(s) of the assemblies 1700 to capture motion of the person to which they are attached. Commencing at block 1800, the sensor assemblies are attached to the person as described above at respective body part locations. As the person subsequently moves, the processor of each assembly 1700 receives pose information block 1802 from the respective motion sensors in the assembly indicating the pose of the body part, i.e., the orientation and in some embodiments geographic location of the respective body part. The pose information may then be transmitted, typically wirelessly, to a virtual reality (VR) device at block 1804 for presentation of a moving image at block 1806 on a display such as the display 14 according to the pose information. Thus, the image presented moves according to how the person moves in generating the pose information, so that the image mirrors the motion of the person. The pose information may be stored for later use as well.

In one implementation, the image in VR is caused to always have one foot on virtual ground. In this technique, ray cast is used, which typically assumes that the foot remains on virtual ground in infinite gravity and infinite friction. Then, the remaining parts of the image are caused to move about the fixed point of the foot according to the pose information from the assemblies 1700.

In another implementation, true dynamics are used to model the motion of the image, in which the image moves according to the pose information according to parameters in a software-implemented physics engine.

Figure 5:
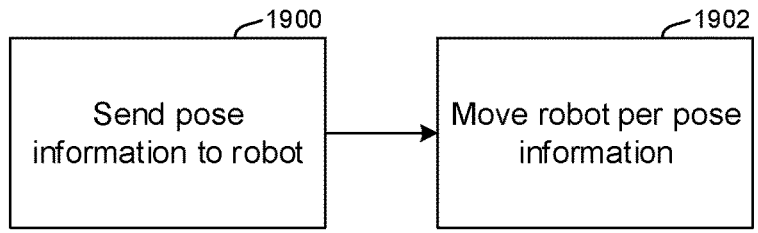

FIG. 5 illustrates that the pose information from the assemblies 1700 may be sent at block 1900 to the robot 1710. Responsive to the pose information, the robot is actuated at block 1902 to move its parts to mimic or mirror the motion of the person.

Figure 6:
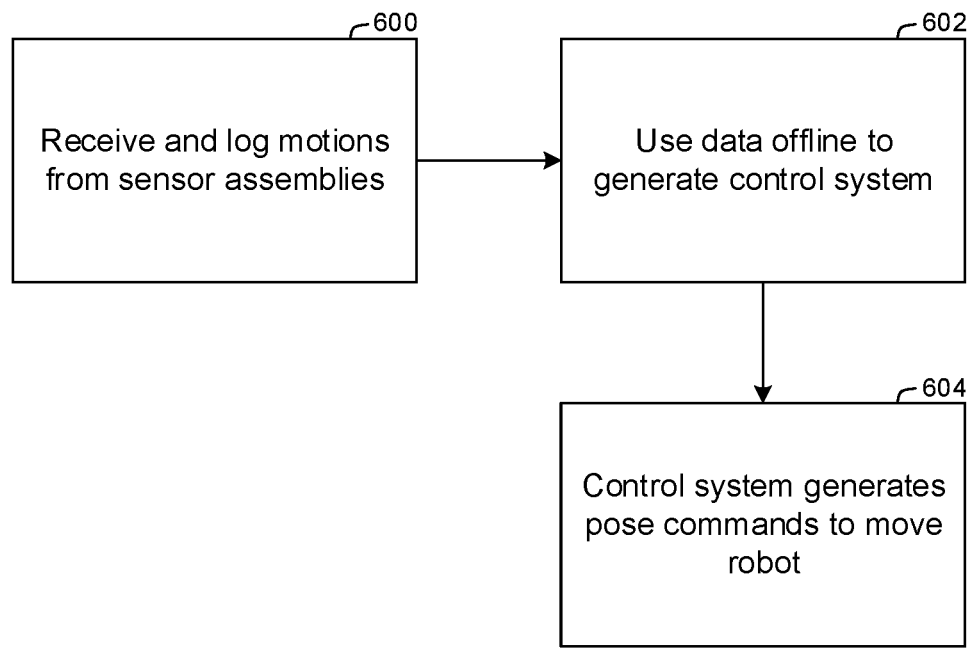

FIG. 6 shows that at block 600, signals representing a person's motions are received from the sensor assemblies and logged. At block 602, the logged data from the sensor assemblies is used offline without involving a robot or simulation to generate a machine learning-based control system that generalizes pose of time and external factors (sensor information) dependency to generate appropriate pose of time dependency, i.e., pose over time. A three layer deep fully connected neural network may be used for this purpose.

Proceeding to block 604, the control system generated at block 602 substitutes for the human and generates poses for the robot. Thus, the control system produces pose of time and sensor data sequences responsive to control input. In an example, "pose of time and sensor data sequences" refers to the 9-axis orientation of the limb or bar to which an assembly 700 is attached as a function of time (e.g., at each incremental interval of time), along with the corresponding sensor outputs. The control input may be a directional input such as "go forward", such as a one-bit wide piece of information. The source of the control input may be a human-operated joystick, an artificial intelligence program, and the like.

Thus, human-generated nine-axis orientation data may be used to control the robot joints in a real-time fashion. The human must account for the robot dynamics when controlling the robot to avoid falling, etc. As this occurs, the robot learns to mimic human dynamics as the data generated by the human is captured and used as training data for the machine learning controller so that the robot movements appear natural and human-like. The output of the training procedure is a new autonomous control algorithm that is capable of generating pose sequences for the robot based on a set of inputs (current pose, sensor data, controller input) from a human-directed input via a game controller, joystick, etc. or from an internal/external decision-making system (AI). These pose sequences are then used in an online fashion by the robot control system to enable the robot to learn as described above.

To undertake the above logic, a "filter" (essentially, a piece of code) may be used to convert relative body pose information into joint angles. In other words, the pose information is converted into a set of values which can be applied to a robot. Quaternions representing the pose information thus may be transformed by the filter into hinge joint angles to move robot body parts as close to the pose defined by quaternions set as possible. Sometimes it is impossible to ensure two body parts are mutually oriented in any desirable way. This is the case when a robot joint has less degree of freedom in comparison with the corresponding human joint. In this case the corresponding robot body part is ensured to be facing the same direction as the human body part that generated the pose information.

In one implementation, Bullet physics tensor flow AI is used to simulate a robot in a computer test to cause robot to "learn" limits of motion input by the human (to stop falling over).

As alluded to above, the present techniques for capturing motion of a person wearing the assemblies 1700 includes VR headset plus human body tracking, tracking an avatar representing the person in the VR world, inexpensive motion capture setup, direct actuator control (e.g., of a robot), training a robot to walk on its own, m machine learning, physically active gaming, direct robot control, collecting training ground truth data for machine learning (Teach the robot how to walk itself), tracking a VR headset with no external sensors/anchors as a subset of demonstrated setup (which may require only two sensors instead of twelve).

Thus, present techniques provide for direct in-game world interaction via simulated physics. No external sensors/anchors are required apart from the wearable assemblies 1700. The techniques described herein natively handles (landscape) height variances and there is no tracking distance limit. Furthermore, IMU (accelerometer) double integration is avoided.

Additionally, absolute orientation is obtained using the disclosed nine-axis sensor assembly. To obtain absolute orientation the nine-axis sensor described above provides acceleration, angular velocity and magnetic field intensity information. A Kalman filter may be used to process the sensor information to obtain the absolute orientation of the respective body part from sensor readings.

With greater specificity, a system model describes how a system evolves over time. It consists of system motion equations. From the system model, projected sensor readings that are supposed to exist given the current system state are determined. The projected sensor readings are compared to actual sensor readings obtained from the nine-axis sensors. Based on the difference between the actual sensor readings and the projected readings the system state is adjusted to refine the system state and make it more closely reflect the real world.

Kalman filtering includes two steps, colloquially called a "prediction step" and a "correction step". The prediction step includes motion equations integration. The correction step includes estimating sensor readings, comparing those with measured ones and refining the system state based on the obtained divergence.

A Kalman filter is probabilistic, meaning that each system process has an additional term. It is noise with zero expected value known covariance. The same is assumed about sensor readings. Each sensor is its expected value plus stochastic noise with zero expected value and known covariance. The bigger noise covariance is, the less influence the appropriate parameter has on system state change.

An alternative approach to fusing information from the sensor assemblies for estimating absolute orientation is to use a complementary filter. It works in the following way. Gyroscope data is subjected to high pass filtering to eliminate gyroscope bias. Then it is integrated to obtain orientation. Accelerometer data is low pass filtered to eliminate the influence of rapid translations. To refine the current system orientation projection, a gradient descent method may be used. The difference from conventional gradient decent is that only one iteration is done at a time. In this context the gradient descent method minimizes the divergence of gravity and magnetic field directions due to system state from ones obtained from sensors. Variables subjected to change are orientation quaternion components.

It will be appreciated that whilst present principals have been described with reference to some example embodiments, these are not intended to be limiting, and that various alternative arrangements may be used to implement the subject matter claimed herein.

What is claimed is:

1. A method comprising:
engaging plural motion sensor assemblies (MSA) to respective body parts, the MSA outputting pose information related to the respective body parts;
providing the pose information to a display apparatus for presenting an image of the body parts having respective poses according to the pose information and rendering the image using ray cast in which a foot of the image is constrained to remain on virtual ground in virtual space.

2. The method of claim 1, comprising rendering the image using ray cast in which the foot of the image is constrained to remain on virtual ground with infinite gravity and infinite friction.

3. The method of claim 1, comprising rendering the image using a modeled dynamics physics engine.

4. The method of claim 1, comprising providing the pose information to a robot to cause the robot to move according to the pose information.

5. The method of claim 4, comprising implementing machine learning on the robot to obey movement commands by generating pose sequences in such a way that robot does not tip over.

6. The method of claim 1, comprising:
processing the pose information using a machine learning-based robot controller; and
moving a robot according to an output of the controller.

7. An assembly comprising:
at least one apparatus;
plural motion sensor assemblies (MSA) outputting pose information related to poses of respective real-world body parts; and
at least one processor associated with the apparatus and configured with instructions for:
receiving the pose information; and
rendering an image using ray cast in which a foot of the image is constrained to remain on virtual ground in virtual space.

8. The assembly of claim 7, wherein the processor is configured with instructions for:
rendering the image using a modeled dynamics involving physics engine.

9. The assembly of claim 7, wherein three respective MSA are attached to each respective arm of the body parts, two MSA are attached to each respective leg of the body parts, and at least one MSA is attached to a torso of the body parts.

10. An assembly comprising:
at least one virtual reality (VR) apparatus;
plural motion sensor assemblies (MSA) outputting pose information related to poses of respective real-world body parts;
at least one transmitter sending the pose information to the VR apparatus; and
at least one processor associated with the VR apparatus and configured with instructions for:
receiving the pose information;
presenting on the VR apparatus at least one image in a VR space that moves in the VR space according to the pose information;
rendering the image using ray cast in which a foot of the image is constrained to remain on virtual ground in the virtual space.

11. An assembly comprising:
at least one virtual reality (VR) apparatus;
plural motion sensor assemblies (MSA) outputting pose information related to poses of respective real-world body parts;
at least one transmitter sending the pose information to the VR apparatus; and
at least one processor associated with the VR apparatus and configured with instructions for:
receiving the pose information;
presenting on the VR apparatus at least one image in a VR space that moves in the VR space according to the pose information; and
rendering the image using ray cast in which a foot of the image is constrained to remain on virtual ground with infinite gravity and infinite friction.

12. An assembly comprising:
at least one apparatus;
plural motion sensor assemblies (MSA) outputting pose information related to poses of respective real-world body parts; and
at least one processor associated with the apparatus and configured with instructions for:

receiving the pose information; and presenting on the apparatus at least one image using ray cast technique in which a foot of the image remains on virtual ground in virtual space.

13. An assembly comprising:

at least one virtual reality (VR) apparatus; and at least one processor associated with the VR apparatus and configured with instructions for:

receiving pose information; and presenting at least one image in a VR space that moves in the VR space according to the pose information using a ray cast technique in which a portion of the image remains on virtual ground in the virtual space.

14. An assembly comprising:

at least one virtual reality (VR) apparatus;

at least one processor associated with the VR apparatus and configured with instructions for:

receiving pose information;

presenting on the VR apparatus at least one image in a VR space that moves in the VR space according to the pose information using a technique in which a portion of the image is constrained to remain on virtual ground with infinite gravity and infinite friction.

\* \* \* \* \*